United States Patent
Yang et al.

(10) Patent No.: US 7,366,927 B2
(45) Date of Patent: Apr. 29, 2008

(54) METHOD AND DEVICE FOR HANDLING REQUESTS FOR CHANGING SYSTEM MODE

(75) Inventors: Chen-Ping Yang, Taipei (TW); Sheng-Chang Peng, Taipei (TW); Juei-Sheng Sheu, Taipei (TW)

(73) Assignee: VIA Technologies, Inc., Taipei (TW)

( * ) Notice: Subject to any disclaimer, the term of this patent is extended or adjusted under 35 U.S.C. 154(b) by 784 days.

(21) Appl. No.: 10/459,085

(22) Filed: Jun. 11, 2003

(65) Prior Publication Data
US 2004/0255170 A1    Dec. 16, 2004

(51) Int. Cl.
*G06F 1/00* (2006.01)
(52) U.S. Cl. ...................................... 713/310
(58) Field of Classification Search ................. 713/310
See application file for complete search history.

(56) References Cited
U.S. PATENT DOCUMENTS 5,752,050 A    5/1998   Hernandez et al.
5,886,541 A *  3/1999   Asato ........................... 326/93
6,738,068 B2 * 5/2004   Cohen et al. ............... 345/519

* cited by examiner

*Primary Examiner*—Rehana Perveen
*Assistant Examiner*—Eric Chang
(74) *Attorney, Agent, or Firm*—Birch, Stewart, Kolasch & Birch, LLP

(57) ABSTRACT

The present invention provides a device for handling requests for changing system mode. The device includes a signal hold/clear unit and a gate control unit. The signal hold/clear unit has the first input receiving a request signal, the second input receiving a control signal, and an output holding the request signal. Wherein, the signal hold/clear unit clears the request signal being held while the control signal is active. The gate control unit has the first input connected to the first input of the signal hold/clear unit, the second input connected to the output of the signal hold/clear unit, the third input connected to the second input of the signal hold/clear unit, and an output. Wherein, the gate control unit passes the request signal while the control signal is active, otherwise blocks the request signal.

19 Claims, 4 Drawing Sheets

METHOD AND DEVICE FOR HANDLING REQUESTS FOR CHANGING SYSTEM MODE

BACKGROUND OF THE INVENTION

1. Field of the Invention

This invention generally relates to the field of computer architecture. More particularly, the present invention relates to a method and device that handles requests for changing system mode.

2. Description of the Prior Art

Nowadays, the graphics-intensive applications for computers such as personal computers (PCs) are increasingly becoming more popular. Such applications include high-end computer-aided drafting (CAD) applications, games, real-time video applications, as well as other applications. As the functionalities of these applications become more powerful, the applications require the computers on which they are run to render and execute graphics much more quickly. Also, as the typical resolution of computer screens has increased from 640×480 pixels to 800×600, 1024×768, 1280×1024 and even beyond and color information per pixel has expanded from 2 bits to 24, 32 and beyond, the processing demand placed on the computers for fast graphics execution has also grown.

In general, the typical computer relies on a graphics card, GFX, (also known as a video card, graphic accelerate card, display adapter, or among other terms) to assist it in displaying graphics on a display device. A graphics card generally includes a specialized processor or processors, which is/are tailor-made for graphics rendering, as well as an unspecific amount of memory. FIG. 1 illustrates a discrete-type computer system block diagram. A GFX 150 connecting to a frame buffer 160 is connected to a North Bridge 120 via the AGP bus. However, a graphics "card" also could be integrated within a single chip, such as a North Bridge, on the motherboard of a computer, as shown in FIG. 2 illustrating an integrated-type computer system block diagram. A GFX 1204 is integrated within a North Bridge 120. The graphics card of either the discrete-type computer system 100 (shown in FIG. 1) or the integrated-type computer system 200 (shown in FIG. 2) can directly request access to a system memory 140 (such as Rambus DRAM, SDR DRAM, DDR SDRAM or DDR SGRAM, etc.) through the memory controller 1202 in the North Bridge 120. In other words, the system memory access that is required by the graphics card does not need to go through the CPU 110.

Nevertheless, the computer system architectures shown in FIG. 1 and FIG. 2 are not the only two system architectures in use and there are also a few others, two examples of such other computer system architectures are shown in FIG. 3 and FIG. 4. The main differences between the computer system architectures of FIG. 3 and FIG. 4 and the computer system architectures of FIG. 1 and FIG. 2 are the placements of the memory controller (numbered 1202 in FIG. 1 and FIG. 2, but numbered 1102 in FIG. 3 and FIG. 4) and the system memory 140. The memory controller 1102 is integrated into the CPU 110 in the computer system architectures of FIG. 3 and FIG. 4, wherein the system memory 140 is coupled to the CPU 110 via the built-in memory controller 1102. That is, the system memory access requested by the graphics card has to go through not only the North Bridge 120 but also the CPU 110.

In addition, increased processor performance has often meant increased power consumption and shortened battery life (for mobile processor-based notebooks/laptops). However, power saving technique is a solution available now in most of the computer systems. When a state where an application program waits for input and a state where there is no input from an input device are continued for a predetermined time period, the supply of the clock from a CPU and the supply of power are stopped. Some applications require less processing power than others, and hence the power saving technique can control the level of the processor performance, dynamically adjusting the operation frequency and voltage many times per second according to the task on hand. By doing so, the power consumption is reduced to extend the operation time of batteries.

Besides, a processor performing states transitions causes both the CPU and the North Bridge clocks to ramp down, the CPU bus and V-Link to disconnect, and memories to enter self-refresh mode, to allow the core frequency and voltage to be dynamically changed in a mobile system. This provides a significant power saving but adding latency to the requests received from devices linked to the North Bridge. Further, the power saving technique often requires a period of a few microseconds to tens of microseconds for states transitions, such as to reduce the operation frequency. During the power saving process period, the CPU is in a complete idle state waiting for the alternation of the operation frequency, and hence the graphics card in the computer system architectures of FIG. 3 and FIG. 4, or any architecture having system memories directly coupled to the CPU, will not be able to request for system memory access through the CPU. That is, no image data can be obtained by the graphics card and displayed on the display device(s) during that period. Furthermore, as mentioned earlier, the operating frequency and voltage might be adjusted many times per second, and that means, within the time of one second, the graphics card might not be able to request the system memory access through the CPU in hundreds of power saving process periods.

In view of the drawbacks mentioned with the prior art of computer architectures, there is a continued need to develop a new and improved method and device that overcomes the disadvantages associated with the prior art of computer architectures. The advantages of this invention are that it solves the problems mentioned above.

SUMMARY OF THE INVENTION

In accordance with the present invention, a method and device for handling requests for changing system mode substantially obviates one or more of the problems resulted from the limitations and disadvantages of the prior art mentioned in the background.

Accordingly, one object of the present invention is to provide a method and device for improving the computer system architecture that has system memories directly coupled to the CPU.

Another object is to provide a method and device for handling requests for changing system mode, so that the effect on the graphics card or other devices caused by the power saving process can be eliminated.

Still another object is to provide a method and device for passing the request signal asking for changing system mode after receiving the control signal sent from the graphics card or other devices.

According to the aforementioned objects, the present invention provides a device for handling requests for changing system mode. The device includes a signal hold/clear unit and a gate control unit. The signal hold/clear unit has the first input receiving a request signal, the second input receiving a control signal, and an output holding the request signal. Wherein, the signal hold/clear unit clears the request signal being held while the control signal is active. The gate control unit has the first input connected to the first input of the signal hold/clear unit, the second input connected to the output of the signal hold/clear unit, the third input connected to the second input of the signal hold/clear unit, and an output. Wherein, the gate control unit passes the request signal while the control signal is active, otherwise the request signal is blocked.

The present invention further discloses a method for handling requests for changing system modes. The method includes providing a control signal, detecting a request for changing system mode, storing and holding the request during the control signal being inactive, passing the request while the control signal is active, and returning an acknowledgement after receiving the request, so that a power saving process can be executed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some embodiments of the invention will now be described in greater detail. Nevertheless, it should be noted that the present invention can be practiced in a wide range of other embodiments besides those explicitly described, and the scope of the present invention is expressly not limited except as specified in the accompanying claims.

Moreover, some irrelevant details are not drawn in order to make the illustrations concise and to provide a clear description for easily understanding the present invention.

The present invention provides a device for handling requests for changing system mode. The device includes a signal hold/clear unit and a gate control unit. The signal hold/clear unit has the first input receiving a request signal, the second input receiving a control signal, and an output holding the request signal. Wherein, the signal hold/clear unit clears the request signal being held while the control signal is active. The gate control unit has the first input connected to the first input of the signal hold/clear unit, the second input connected to the output of the signal hold/clear unit, the third input connected to the second input of the signal hold/clear unit, and an output. Wherein, the gate control unit passes the request signal while the control signal is active, otherwise blocks the request signal. Moreover, the gate control unit further includes an OR gate and an AND gate. The OR gate has the first input being the first input of the gate control unit, the second input being the second input of the gate control unit, and an output. The AND gate has the first input connected to the output of the OR gate, the second input being the third input of the gate control unit, and an output being the output of the gate control unit.

The present invention further discloses a method for handling requests for changing system modes. The method includes providing a control signal, detecting a request for changing system mode, storing and holding the request during the control signal being inactive, passing the request while the control signal is active, and returning an acknowledgement after receiving the request, so that a power saving process can be executed.

Figure 1:
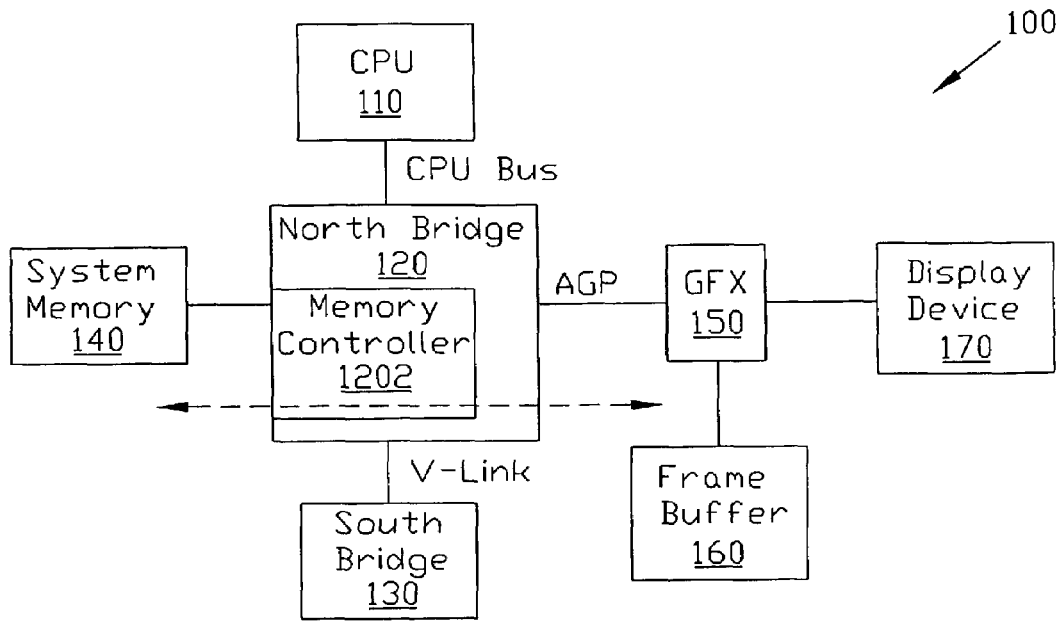
FIG. 1 illustrates a schematic well-known discrete-type computer system block diagram.
Figure 2:
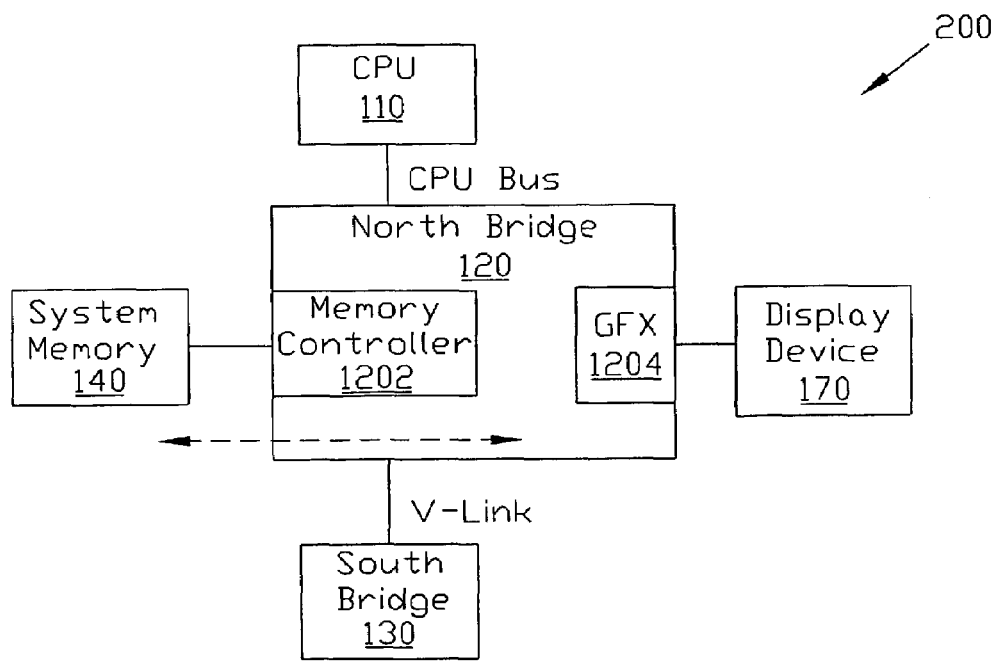
FIG. 2 illustrates a schematic well-known integrated-type computer system block diagram.
Figure 3:
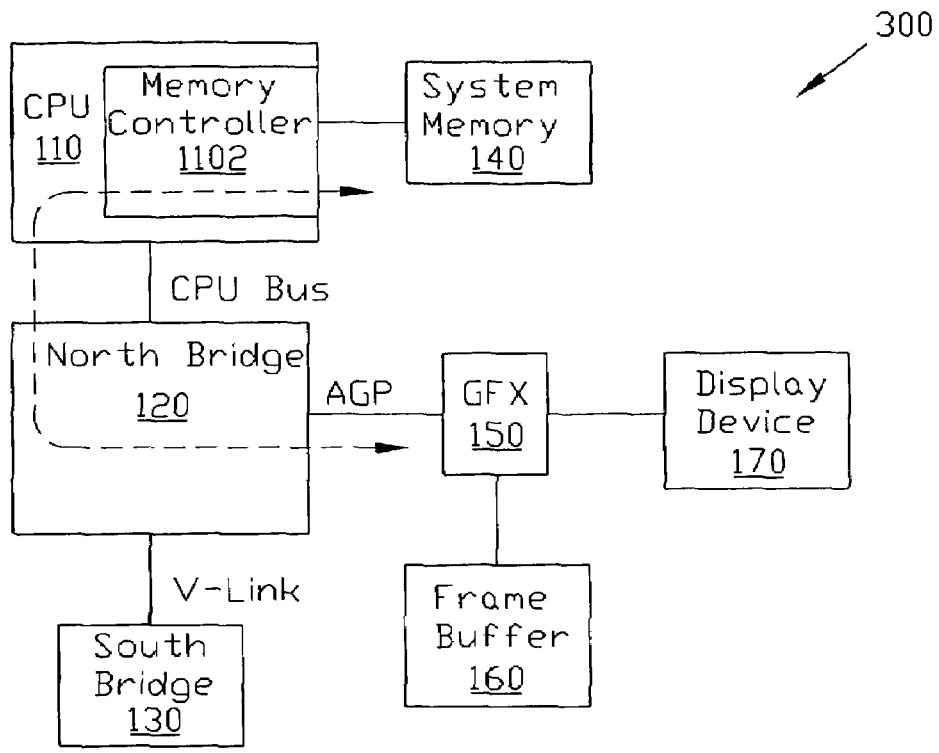
FIG. 3 illustrates another example block diagram for the discrete-type computer system architecture.
Figure 4:
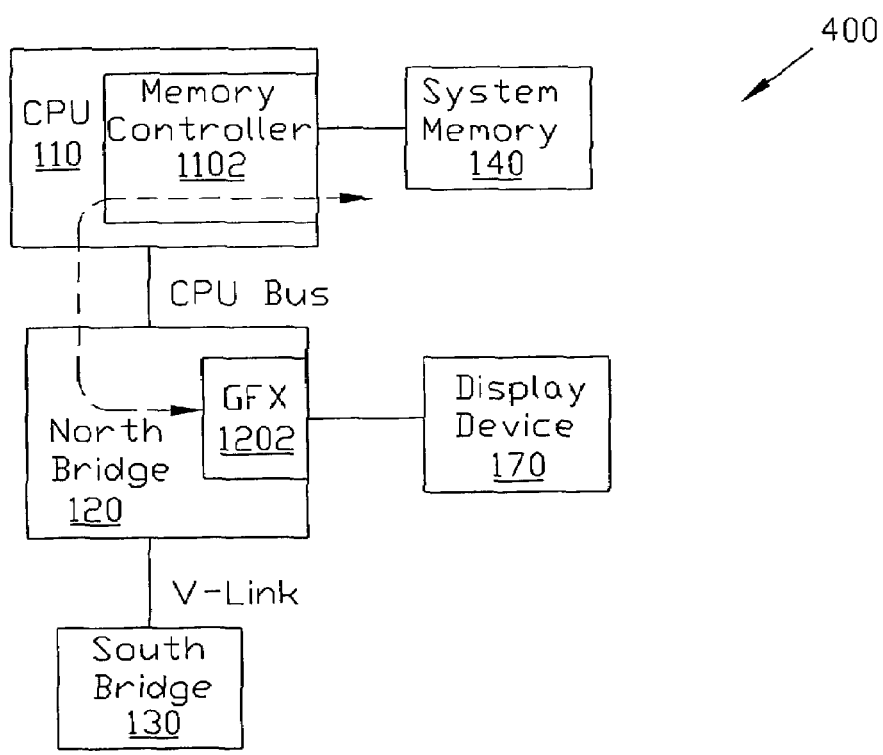
FIG. 4 illustrates another example block diagram for the integrated-type computer system architecture.
Figure 5:
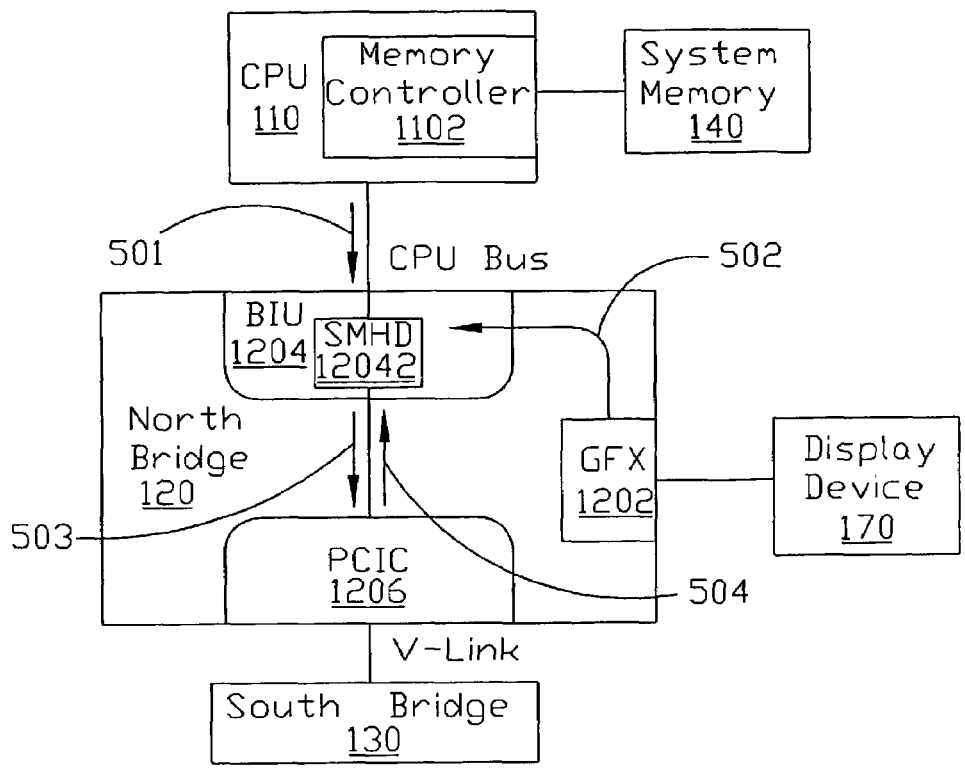
FIG. 5 illustrates a preferred embodiment block diagram for a System Management Handling Device (SMHD) in accordance with the present invention.

As shown in FIG. 5, a preferred embodiment block diagram for handling requests for changing system mode is illustrated. A CPU 110 has a built-in memory controller 1102, and furthermore has the ability to ask for changing system mode from a normal operating mode to a power saving mode by sending a request signal 501. A system memory 140 couples to the CPU 110 through the built-in memory controller 1102. A North Bridge 120 connects to the CPU 110 through a CPU bus, and further includes a graphics controller (GFX) 1202, a System Management Handling Device (SMHD) 12042, and a Peripheral Component Interconnect Core (PCIC) 1206 connecting to the SMHD 12042. Wherein, the GFX 1202 is an integrated functional module (also can be a separately functional module), connecting to the SMHD 12042 for sending a control signal 502, and connects to a display device 170, such as a CRT display or a flat panel display, for displaying data. Further, the control signal 502 is active while the display device 170 is within the non-displaying period or while the display buffer of the GFX 1202 has stored enough data to be displayed during the period of executing the power saving process. The SMHD 12042 within a Bus Interface Unit (BIU) 1204 connects to the CPU 110 through the CPU bus for receiving the request signal 501, and holds the request signal 501 during the control signal 502 being inactive (such as a logic "1" to a negative logic circuit, or a logic "0" to a positive logic circuit), or passes the request signal 501 as a passing request signal 503 while the control signal 502 is active (such as a logic "1" to a positive logic circuit, or a logic "0" to a negative logic circuit). By doing so, the request signal 501 is handled by the SMHD 12042 according to the control signal 502 sent by the GFX 1202. A South Bridge 130 connects to the North Bridge 120 through a V-Link (or a PCI) bus and the PCIC 1206, and has the ability to acknowledge the passing request signal 503 by returning an acknowledgement signal 504 to the CPU 110. After receiving the acknowledgement signal 504, the CPU 110 can then proceed with the power saving process as originally requested.

However, it should be understood that the control signal in the present invention can be generated by any other functional module, not limited to the GFX, any functional module that requests the system memory access while not to be affected by the power saving process and which is not communicating via the South Bridge 130.

Figure 6:
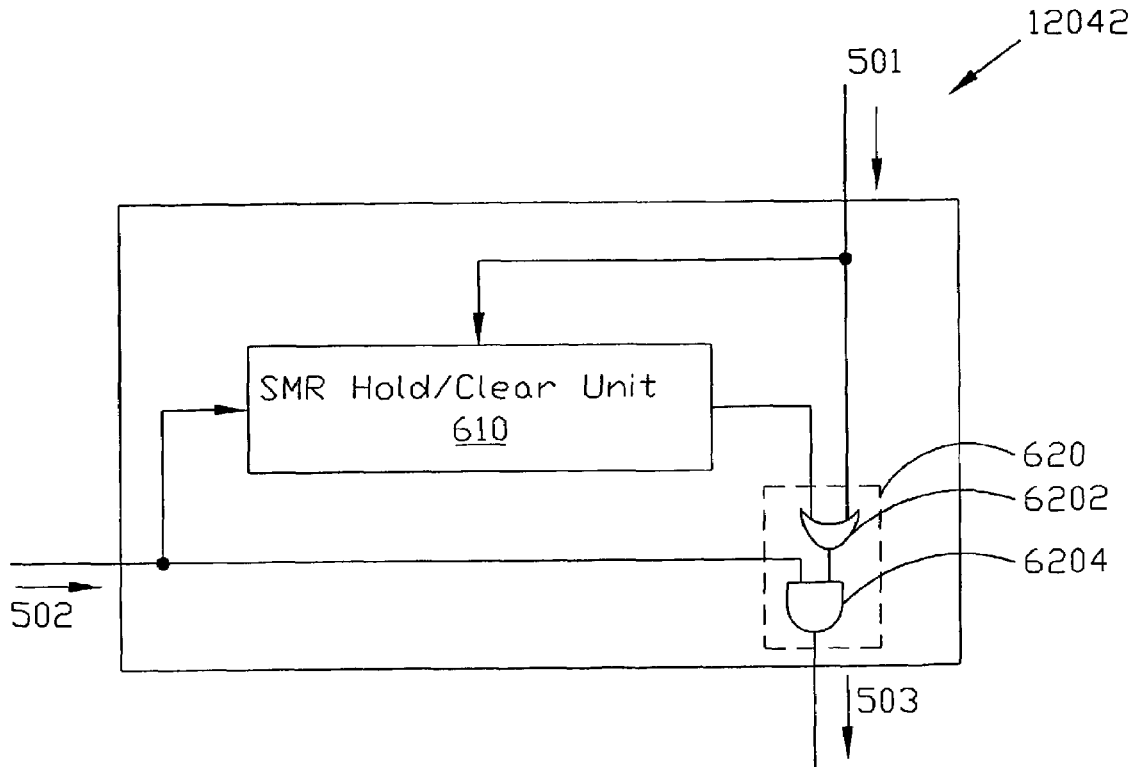
FIG. 6 illustrates a schematic SMHD block diagram in accordance with the present invention.

As shown in FIG. 6, a preferred SMHD block diagram in accordance with the present invention is illustrated. The SMHD 12042 includes a signal (system management request, SMR) hold/clear unit 610 and a gate control unit 620. The SMR hold/clear unit 610 has a first input connected to the CPU and receiving the request signal 501 sent by the CPU, a second input connected to a functional module (such as the GFX) and receiving the control signal 502 sent by the functional module, and an output. Wherein, the SMR hold/clear unit 610 holds the request signal 501 when the control signal 502 is inactive, or passes and clears the request signal 501 while the control signal 502 is active. The gate control unit 620 includes an OR gate 6202 and an AND gate 6204. The OR gate 6202 has a first input connected to the first input of the SMR hold/clear unit 610 for receiving the request signal 501 sent by the CPU, a second input connected to the output of the SMR hold/clear unit 610 for receiving the request signal passed by the SMR hold/clear unit 610, and an output. The AND gate 6204 has a first input connected to the output of the OR gate 6202, a second input connected to the second input of the SMR hold/clear unit 610 for receiving the control signal 502, and an output. Wherein, according to the logic operation of the AND gate 6204, the gate control unit 620 blocks the request signal 501 during the control signal 502 being inactive, or passes the request signal 501 as the passing request signal 503 while the control signal 502 is active. That is, for example, the passing request signal 503 depends on the request signal 501 while the control signal 502 is "1". On the other hand, the passing request signal 503 is always "0" while the control signal 502 is "0".

Figure 7:
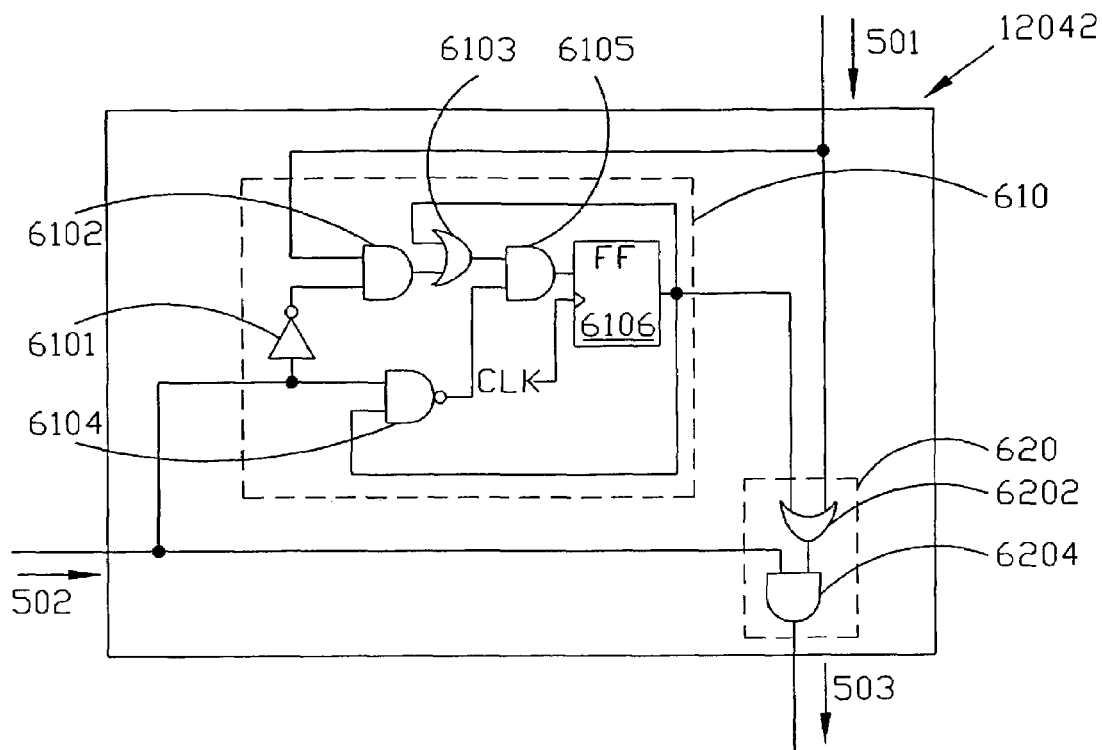
FIG. 7 illustrates a preferred embodiment logic circuit for the SMHD in accordance with the present invention.

As shown in FIG. 7, one preferred example logic circuit of the SMHD 12042 in accordance with the present invention is illustrated. The signal (SMR) hold/clear unit 610 includes an inverter 6101, a first AND gate 6102, an OR gate 6103, a NAND gate 6104, a second AND gate 6105, and a flip-flop 6106. The inverter 6101 has an input and an output. The first AND gate 6102 has a first input connected to the output of the inverter 6101, a second input, and an output. The OR gate 6103 has a first input connected to the output of the first AND gate 6102, a second input, and an output. The NAND gate 6104 has a first input connected to the input of the inverter 6101, a second input, and an output. The second AND gate 6105 has a first input connected to the output of the OR gate 6103, a second input connected to the output of the NAND gate 6104, and an output. The flip-flop 6106 has an input connected to the output of the second AND gate 6105, a clock input connected to a system clock, and an output connected to the second input of the OR gate 6103 and to the second input of the NAND gate 6104. Wherein, the input of the inverter 6101, the second input of the first AND gate 6102, and the output of the flip-flop 6106 are respectively used as the second input, the first input, and the output of the SMR hold/clear unit 610 described above. Furthermore, the connections between the SMR hold/clear unit 610 and the gate control unit 620 (including the OR gate 6202 and the AND gate 6204) are the same as the connections described above as well.

While the control signal 502 sent by a functional module, such as the GFX, is "0" and the request signal 501 sent by the CPU intending to execute a power saving process is "1", the first input of the first AND gate 6102 receives "1" after the inverter 6101 inverts the inactive control signal 502 and the second input of the first AND gate 6102 directly receives "1" from the request signal 501. Hence, the output of the first AND gate 6102 is "1". The first input of the OR gate 6103 receives "1" from the output of the first AND gate 6102, and hence the output of the OR gate 6103 is "1", no matter what the second input of the OR gate 6103 receives. The first input of the NAND gate 6104 directly receives "0" from the control signal 502, and hence the output of the NAND gate 6104 is "1", no matter what the second input of the NAND gate 6104 receives. The output of the second AND gate 6105 is "1" since the first input and the second input of the second AND gate 6105 respectively receive "1" from the output of the OR gate 6103 and the output of the NAND gate 6104. Therefore, the flip-flop 6106 latches the "1" received from the output of the second AND gate 6105. In other words, the SMR hold/clear unit 610 holds the request signal 501 while the control signal 502 is inactive. As for the gate control unit 620, the first input of the OR gate 6202 directly receives "1" from the request signal 501, and hence the output of the OR gate 6202 is "1", no matter what the second input of the OR gate 6202 receives from the output of the flip-flop 6106. The output of the AND gate 6204 is "0" since the second input of the AND gate 6204 directly receives "0" from the control signal 502 and no matter what the first input of the AND gate 6204 receives from the output of the OR gate 6202. That is, the gate control unit 620 blocks the request signal 501 while the control signal 502 is inactive.

While the control signal 502 is still remaining at "0" but the request signal 501 changes to "0", the first input of the first AND gate 6102 receives "1" after the inverter 6101 inverts the inactive control signal 502 and the second input of the first AND gate 6102 directly receives "0" from the request signal 501. Hence, the output of the AND gate 6102 changes to "0". The first input of the OR gate 6103 receives "0" from the output of the first AND gate 6102, and hence the output of the OR gate 6103 depends on what the second input of the OR gate 6103 receives from the output of the flip-flop 6106. According to the previous status, the flip-flop 6106 latches "1". Therefore, the second input of the OR gate 6103 receives "1" to make the output of the OR gate 6103 be "1". The first input of the NAND gate 6104 directly receives "0" from the control signal 502, and hence the output of the NAND gate 6104 is "1", no matter what the second input of the NAND gate 6104 receives. The output of the second AND gate 6105 still remains at "1" since the first input and the second input of the second AND gate 6105 respectively receive "1" from the output of the OR gate 6103 and the output of the NAND gate 6104. Therefore, the flip-flop 6106 still latches "1" received from the output of the second AND gate 6105. That is, the SMR hold/clear unit 610 holds the request signal 501 at "1" during the control signal 502 being inactive even if the request signal has been changed. As for the gate control unit 620, the first input of the OR gate 6202 directly receives "0" from the request signal 501, the second input of the OR gate 6202 receives "1" from the output of the flip-flop 6106, and hence the output of the OR gate 6202 is "1". The output of the AND gate 6204 is "0" since the second input of the AND gate 6204 directly receives "0" from the control signal 502 and no matter what the first input of the AND gate 6204 receives from the output of the OR gate 6202. That is, the gate control unit 620 blocks the output of the flip-flop 6106 during the control signal 502 being inactive.

While the control signal 502 changes to "1" but the request signal 501 remains at "0", the first input of the OR gate 6202 directly receives "0" from the request signal 501, hence the output of the OR gate 6202 also depends on what the second input of the OR gate 6202 receives from the output of the flip-flop 6106. According to the previous status, the flip-flop 6106 latches "1". Therefore, the second input of the OR gate 6202 receives "1" to make the output of the OR gate 6202 to be "1". The output of the AND gate 6204 hence changes to "1" since the second input of the AND gate 6204 directly receives "1" from the control signal 502 and the first input of the AND gate 6204 receives "1" from the output of the OR gate 6202 as well. That is, the gate control unit 620 passes the request signal held by the SMR hold/clear unit 610 while the control signal 502 is active. As for the SMR hold/clear unit 610, the first input of the first AND gate 6102 receives "0" after the inverter 6101 inverts the active control signal 502 and the second input of the first AND gate 6102 directly receives "0" from the request signal 501. Hence, the output of the AND gate 6102 changes to "0". The first input of the OR gate 6103 receives "0" from the output of the first AND gate 6102, and hence the output of the OR gate 6103 depends on what the second input of the OR gate 6103 receives from the output of the flip-flop 6106. According to the previous status, the flip-flop 6106 latches "1". Therefore, the second input of the OR gate 6103 receives "1" to make the output of the OR gate 6103 remain "1". The first input of the NAND gate 6104 directly receives "1" from the control signal 502, hence the output of the NAND gate 6104 depends on what the second input of the NAND gate 6104 receives from the output of the flip-flop 6106. According to the previous status, the flip-flop 6106 latches "1". Therefore, the second input of the NAND gate 6104 receives "1" to make the output of the NAND gate 6104 change to "0". The output of the second AND gate 6105 is "0" since the first input and the second input of the second AND gate 6105 respectively receive "1" and "0" from the output of the OR gate 6103 and the output of the NAND gate 6104. Therefore, the flip-flop 6106 latches the "0" received from the output of the second AND gate 6105. That is, the SMR hold/clear unit 610 clears the request signal while the control signal 502 is active. This whole situation described above to the SMHD 12042 is to clear the previous request signal after passing it.

While the control signal 502 is "1" and the request signal 501 is "1" as well, the first input of the OR gate 6202 directly receives "1" from the request signal 501 and hence the output of the OR gate 6202 is "1", no matter what the second input of the OR gate 6202 receives from the output of the flip-flop 6106. The output of the AND gate 6204 is "1" since the second input of the AND gate 6204 directly receives "1" from the control signal 502 and the first input of the AND gate 6204 receives "1" from the output of the OR gate 6202 as well. That is, the gate control unit 620 directly passes the request signal 501 while the control signal 502 is active. As for the SMR hold/clear unit 610, the first input of the first AND gate 6102 receives "0" after the inverter 6101 inverts the active control signal 502 and the second input of the first AND gate 6102 directly receives "1" from the request signal 501. Hence, the output of the first AND gate 6102 is "0". The first input of the OR gate 6103 receives "0" from the output of the first AND gate 6102, and hence the output of the OR gate 6103 depends on what the second input of the OR gate 6103 receives from the output of the flip-flop 6106. According to the previous status, the flip-flop 6106 latches "0". Therefore, the second input of the OR gate 6103 receives "0" to make the output of the OR gate 6103 be "0". The first input of the NAND gate 6104 directly receives "1" from the control signal 502, hence the output of the NAND gate 6104 depends on what the second input of the NAND gate 6104 receives from the output of the flip-flop 6106. According to the previous status, the flip-flop 6106 latches "0". Therefore, the second input of the NAND gate 6104 receives "0" to make the output of the NAND gate 6104 be "1". The output of the second AND gate 6105 is "0" since the first input and the second input of the second AND gate 6105 respectively receive "0" and "1" from the output of the OR gate 6103 and the output of the NAND gate 6104. Therefore, the flip-flop 6106 still latches the "0" received from the output of the second AND gate 6105. That is, the SMR hold/clear unit 610 clears the request signal while the control signal 502 is active. This whole situation described above to the SMHD 12042 is to clear the request signal after passing it.

However, it should be understood that various logic circuit combinations could achieve the functionalities of the SMHD. Therefore, the logic circuit of the SMHD should be not limited on the preferred example logic circuit described above.

Figure 8:
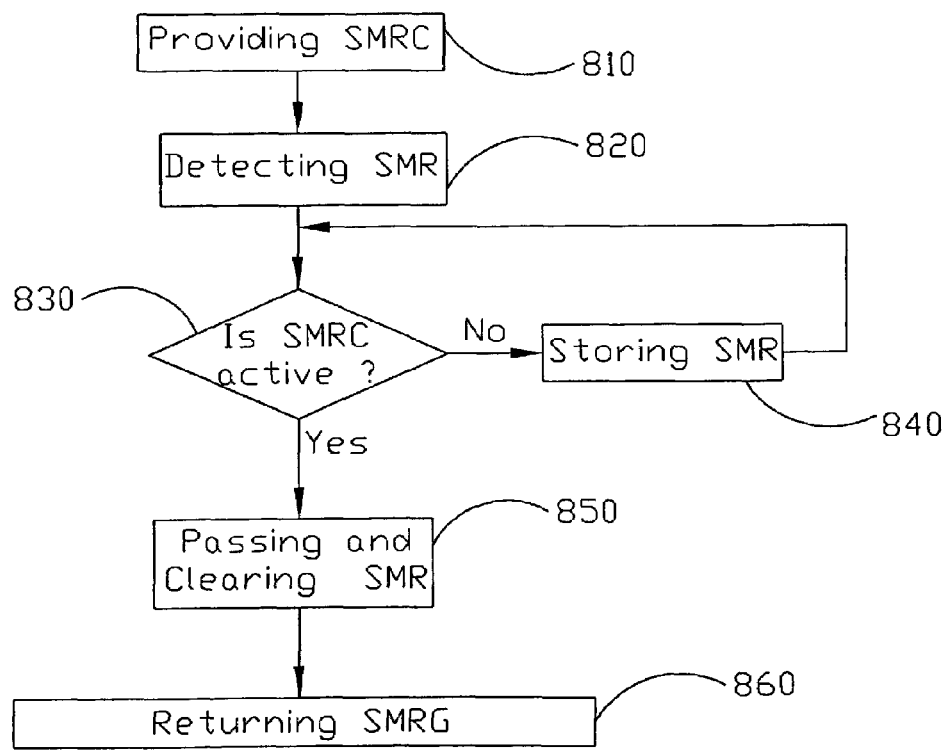
FIG. 8 illustrates a flowchart for handling requests for changing system mode in accordance with the present invention.

As shown in FIG. 8, a flowchart for handling requests for changing system mode in accordance with the present invention is illustrated. In step 810, providing a control signal (system management request control signal, SMRC signal). Wherein, the SMRC signal is provided by a functional module (such as the GFX) that requests system memory access while not to be affected by the power saving process. In step 820, detecting a system management request (SMR) signal for changing system mode. Wherein, the SMR signal is sent by the CPU asking for executing the power saving process. In step 830, judging whether the SMRC signal is active or inactive. In step 840, storing and holding the SMR signal in the SMR hold/clear unit during the SMRC signal being inactive. In step 850, passing the SMR signal and clearing the output of the SMR hold/clear unit while the SMRC signal is active. For example, the SMRC signal is active while the display buffer of the GFX has stored enough data to be displayed during the period of executing the power saving process or while the display device is within the non-displaying period, such as a horizontal blanking interval or a vertical blanking interval, and so forth. In step 860, returning an acknowledgement (system management request granted, SMRG) to the CPU from the South Bridge after receiving the SMR signal, so that the power saving process can be executed.

Although specific embodiments have been illustrated and described, it will be obvious to those skilled in the art that various modifications may be made without departing from what is intended to be limited solely by the appended claims.

What is claimed is:

1. A device for handling requests for changing system mode from a CPU's normal operating mode to power saving mode wherein system memory is directly coupled to the CPU, said device comprising:
   a first input terminal coupled to receive a request signal from the CPU asking for entering the power saving mode;
   a second input terminal coupled to receive a control signal representing a state of a graphics display;
   means for detecting said control signal to determine said state of said graphics display; and
   means for controllably outputting said request signal according to said detected control signal.

2. The device according to claim 1, further comprising means for clearing said outputting means after said request signal is outputted.

3. A device for handling requests for changing system mode from a CPU's normal operating mode to power saving mode wherein system memory is directly coupled to the CPU, said device comprising:
   a signal hold/clear unit having a first input receiving a request signal from the CPU, a second input receiving a control signal, and an output for holding said request signal while said control signal is inactive; and
   a gate control unit having a first input connected to said first input of said signal hold/clear unit, a second input connected to said output of said signal hold/clear unit, a third input connected to said second input of said signal hold/clear unit, and an output, wherein said gate control unit passes said request signal while said control signal is active.

4. The device according to claim 3, wherein said gate control unit further comprising:
an OR gate having a first input being said first input of said gate control unit, a second input being said second input of said gate control unit, and an output; and an AND gate having a first input connected to said output of said OR gate, a second input being said third input of said gate control unit, and an output being said output of said gate control unit.

5. The device according to claim 3, wherein said first input of said signal hold/clear unit is connected to the CPU.

6. The device according to claim 3, wherein said second input of said signal hold/clear unit is connected to a functional module that requests system memory access while not to be affected by changing system mode.

7. The device according to claim 6, wherein said functional module comprises a graphics controller.

8. The device according to claim 3, wherein said gate control unit blocks said request signal during said control signal being inactive.

9. A computer system for handling requests for changing system mode from a normal operating mode to power saving mode, said computer system comprising:
a CPU having a built-in memory controller, wherein said CPU is capable of generating a request signal for changing system mode;
a system memory directly coupling to said CPU via said built-in memory controller;
a functional module for providing a control signal;
a North Bridge connecting to said CPU through a bus, wherein said North Bridge further comprises a System Management Handling Device (SMHD) for receiving said request and said control signal to decide whether to pass on said request signal or not; and
a South Bridge connecting to said North Bridge for returning acknowledgement once receiving said request signal from said SMHD.

10. The computer system according to claim 9, wherein said functional module requests system memory access while not to be affected by changing system mode.

11. The computer system according to claim 10, wherein said functional module comprises a graphics controller.

12. The computer system according to claim 9, wherein said SMHD holds the request signal while the control signal received from said functional module is inactive.

13. The computer system according to claim 9, wherein said SMHD passes said request signal to said South Bridge while said control signal received from said functional module is active.

14. A method for handling requests for changing system mode from a CPU's normal operating mode to power saving mode wherein system memory is directly coupled to the CPU, said method comprising:
providing a control signal for allowing the CPU to change system mode;
detecting a request from the CPU for changing system mode; storing and holding said request during the control signal being inactive;
passing said request while said control signal is active; and
returning an acknowledgement after said request is passed, so that the CPU's system mode is allowed being changed from normal operating mode to power saving mode.

15. The method according to claim 14, further comprising clearing the request being stored while said control signal is active.

16. The method according to claim 14, wherein said request is sent by the CPU.

17. The method according to claim 14, wherein said control signal is sent by a functional module that requests system memory access while not to be affected by changing system mode.

18. The method according to claim 17, wherein said functional module comprises a graphics controller.

19. The method according to claim 14, wherein said acknowledgement is sent by a South Bridge.

* * * * *